United States Patent
O'Neill

(10) Patent No.: US 7,713,731 B2
(45) Date of Patent: May 11, 2010

(54) SYSTEMS AND METHODS FOR GENERATING COMPOST

(75) Inventor: Frederick Timothy O'Neill, Seattle, WA (US)

(73) Assignee: Engineered Compost Systems, Inc., Seattle, WA (US)

(*) Notice: Subject to any disclaimer, the term of this patent is extended or adjusted under 35 U.S.C. 154(b) by 697 days.

(21) Appl. No.: 11/557,924

(22) Filed: Nov. 8, 2006

(65) Prior Publication Data

US 2007/0111305 A1   May 17, 2007

Related U.S. Application Data

(60) Provisional application No. 60/735,994, filed on Nov. 9, 2005.

(51) Int. Cl.
*C12M 1/00* (2006.01)
(52) U.S. Cl. .............. 435/290.1; 435/290.2; 435/300.1
(58) Field of Classification Search ... 435/290.1–290.4, 435/299.1, 300.1
See application file for complete search history.

(56) References Cited

U.S. PATENT DOCUMENTS

| | | | |
|---|---|---|---|
| 4,084,358 A * | 4/1978 | Winters | 52/4 |
| 4,521,517 A | 6/1985 | Gauthier | |
| 4,798,802 A | 1/1989 | Ryan | |
| 5,145,581 A * | 9/1992 | Novy et al. | 210/609 |

(Continued)

FOREIGN PATENT DOCUMENTS

| WO | 97/19901 A1 | 6/1997 |
|---|---|---|
| WO | WO 2005092819 A2 * | 10/2005 |

OTHER PUBLICATIONS

Mathsen, Don, "Evaluating Compost and Biofilter Aeration Performance," BioCycle magazine (Jun. 2004).

(Continued)

*Primary Examiner*—Walter D Griffin
*Assistant Examiner*—Shanta G Doe
(74) *Attorney, Agent, or Firm*—Janet Sleath; Speckman Law Group PLLC

(57) ABSTRACT

Systems and methods for the generation of compost are provided. In one embodiment, the system for generating compost comprises an aeration floor having a plurality of gas flow apertures that connect to a network of gas flow channels, and a compost cover constructed of a gas and liquid impermeable fabric that is provided with a plurality of ports that permit the passage of gas and liquid through the compost cover. A compost biomass is placed on the aeration floor and the compost cover is placed over the compost biomass. An air suction manifold, connected to an outlet of the gas flow channels, draws exhaust gases from the compost biomass, through the plurality of gas flow apertures and through the gas flow channels. The exhaust gases are then conveyed to an air distributor and directed to an odor control device for substantially eliminating odors.

13 Claims, 2 Drawing Sheets

U.S. PATENT DOCUMENTS

| | | | |
|---|---|---|---|
| 5,269,829 | A | 12/1993 | Meyer |
| 5,345,744 | A | 9/1994 | Cullen |
| 5,452,562 | A | 9/1995 | Cullen |
| 6,099,613 | A | 8/2000 | Allen et al. |
| 6,383,803 | B1 | 5/2002 | Allen et al. |

OTHER PUBLICATIONS

Wilson, G.B. et al., "Manual For Composting Sewage Sludge by the Beltsville Aerated-Pile Method," Grant No. S803468, Municipal Environmental Research Laboratory Office of Research and Development, U.S. Environmental Protection Agency, Cincinnati, Ohio (May 1980).

Natural Resource, Agriculture, and Engineering Service, "On-Farm Composting Handbook," http://www.css.cornell.edu/compost/OnFarmHandbook/ch4.pg29.html, pp. 29 (1992).

W.L. Gore & Associates GMBH, "The Principle of Waste Treatment with Gore Cover," http://pdf.directindustry.com/pdf/gore-electronics/the-principle-of-waste-treatment/24941-37497.html, Germany (2001).

\* cited by examiner

SYSTEMS AND METHODS FOR GENERATING COMPOST

CROSS REFERENCE TO RELATED APPLICATIONS

This application claims priority under 35 U.S.C. §119(e) to U.S. Provisional Patent Application No. 60/735,994, filed Nov. 9, 2005.

FIELD OF THE INVENTION

This invention generally relates to systems and methods for generating compost. More particularly, the invention relates to an aerated compost generation system that provides substantial reduction of compost odor emission and evaporative drying of compost.

BACKGROUND OF THE INVENTION

Composting is an effective waste management tool used to convert organic wastes into useful products. Various systems and methods for generating compost to improve the disposal and the beneficial re-use of organic wastes, such as garden waste, bio-solids, agricultural waste, municipal solid waste and the like, are known. Many of these systems and methods focus on the improvement of compost odor control, the rapid stabilization of compost, and the reduction of operating costs.

One type of compost generating system known in the art involves aeration. Generally, there are two different types of aeration: forced aeration and passive aeration. Forced, or fan-induced, aeration is generally utilized to provide sufficient oxygen for maintaining aerobic conditions of the microbes needed for compost generation. Forced aeration is also employed to maintain optimal temperature levels in order to reduce the production of odorous emissions. There are two basic types of forced aeration: positive and negative aeration. Composting systems that use positive aeration introduce air to the bottom of the compost pile, and the air exits the compost pile at the top of the pile. Composting systems that use negative aeration draw air from the surface of the compost pile, and the air is distributed down through an aeration floor and into an aeration network, where the odiferous air is treated to reduce its odor. Composting systems that utilize positive aeration have the disadvantage that ammonia and other odorous and/or corrosive gases are released from the surface of the compost pile. Systems that employ negative aeration usually have operational problems associated with the collection, removal and disposal of particulate matter and moisture drawn into the aeration networks.

Composting using passive aeration systems is generally carried out in large scale using turned windrow and passive heaps. However, these systems are commonly associated with significant compost odor emissions due to low oxygen levels, uncontrolled temperatures, and open compost piles.

In another type of compost generating system, the composting processes take place in enclosed structures. These enclosed systems are capable of capturing the odiferous air resulting from the composting process, which usually evolves at the surface of the compost pile. The captured odiferous air is then conveyed to a fan exhaust and treated for odor reduction before being released into the surroundings.

There are generally three different types of enclosed compost generating systems: in-vessel composting systems, in-building composting systems, and fabric-covered composting systems. In-vessel composting systems provide a sealed and insulated space for the biomass for each controlled volume of generated compost. In-building composting systems involve one or more open piles of compost stored in a single building, sharing a common headspace and sometimes intermingling biomass. Fabric-covered composting systems utilize a fabric, or film, to cover a discrete volume of compost, and can be used either in an enclosed structure or in an open area.

Three kinds of fabric or film covers are generally used in connection with fabric-covered composting systems. Macro-porous covers, such as the Compostex® brand, are constructed of a macro-porous fabric that is akin to a blanket. Macro-porous covers allow easy passage of air and can be used with composting systems that involve positive and/or negative aeration. Such covers are relatively thick, and provide moderate thermal insulation and minimal reduction of surface evaporation rates. They have the disadvantage that they do not control compost odors and are water-absorbent, and can therefore become heavy and difficult to transport.

Micro-porous covers are generally constructed of micro-porous, gas permeable, fabric and provide low air-flow rates. They can only be used with composting systems that involve positive aeration and require weighted edges to hold the covers in place as the covers tend to "balloon", due to gas flow constriction through the fabric. The low air flow rates result in low oxygen levels and very high temperatures of the biomass. These conditions reduce the efficiency of the aerobic bacteria that generate the compost. Micro-porous covers allow minimal passage of moisture, thereby preventing drying. In addition, most of the water soluble odiferous compounds are trapped in the water under the cover and are therefore not released into the atmosphere. Further, micro-porous covers provide little thermal insulation, are quite heavy and are very expensive.

A third type of cover used with composting systems is impermeable plastic sleeves that are adapted from silage bags used to prepare and store feed for cattle. These sleeves are generally constructed of polyethylene, have a tube configuration up to about 200 feet in length, and are filled with compost by means of a special machine. The machine can also be employed to insert a perforated aeration tube into the center of the impermeable plastic sleeve. Air ports are located along the length of the aeration tube, allowing air to be drawn in and out of the impermeable plastic sleeve. However, the resulting aeration is very uneven radially about and along the axis of the sleeve. As a result, the generated compost is usually dry on top and saturated with moisture at the bottom. In order to access the compost after processing, the plastic sleeve, or tube, is slit and disposed of, and is thus not reusable. Further, foul leachate is often released onto the ground and surroundings when the plastic sleeve is removed. Compost generated using these plastic sleeves often requires significant additional processing to obtain stability.

There thus remains a need for compost generating systems and methods that overcome the aforementioned disadvantages and problems.

SUMMARY OF THE INVENTION

Systems and methods for generating compost utilizing negative aeration are provided. The systems disclosed herein are capable of controlling compost odors, maintaining the desired oxygen levels in the biomass, and minimizing evaporative drying of the biomass.

In one embodiment, the composting system comprises a reusable compost cover formed from substantially impermeable material, and an aeration floor. Biomass for use in generating compost is placed on the aeration floor, and the compost cover is placed over the biomass. The edges of the compost cover, which substantially covers the biomass, may be weighted and/or connected to the aeration floor by way of strapping means connected to fastening points in the aeration floor, in order to provide a loose seal to the aeration floor. During operation, the compost cover is further held in place by the negative aeration, or suction, generated by the aeration floor.

The compost cover is formed of a material that is substantially gas and liquid impermeable, and comprises a plurality of aeration ports, or orifices, positioned on the surface of the compost cover that permit the passage of gases through the cover. The size and number of aeration ports may be varied to meet the air-flow requirements for given biomass, or feed stocks, zone size, and process goals. The compost cover is generally constructed of fabric that is durable, UV resistant, waterproof, and relatively light-weight.

The aeration floor may be constructed of concrete, or the like, and has a generally flat, planar working surface. The surface of the aeration floor is provided with a plurality of gas flow apertures, or orifices, that connect to at least one gas flow pipe, or channel, installed below grade. In certain embodiments, a network of gas flow pipes and/or channels is provided. An air suction manifold is sealably and removably connected to at least one outlet of the network of gas flow channels and/or pipes, providing air removal from the compost biomass. The air suction manifold draws air and/or other gases downwards from the bottom area of the biomass, through the plurality of gas flow apertures in the aeration floor, and into the network of gas flow channels and/or pipes. The air travels through the network of channels and/or pipes and is conveyed towards the outlet. The air then passes through the air suction manifold to an air distributor that is sealably and removably connected to the air suction manifold. Through the air distributor, the air from the compost biomass is distributed towards a discharge manifold. The discharge manifold directs the air towards an odor control device, such as a biofilter, where the air is treated to substantially eliminate the compost odor.

The composting system may be connected to a central aeration and control system which controls the air flow, temperature, pressure, and other variables of the composting system via automatic or manual means. The aeration and control system serves to secure the compost cover, and to deliver and modulate the air flow to maintain the desired conditions in the compost biomass. In one embodiment, the aeration and control system is automated to modulate the flow of air based on the feedback of at least one process variable. The ranges of the variables may be preset by an operator. Process variables include, but are not limited to, temperature, oxygen level, pressure, and the like.

In another embodiment, the composting system comprises a compost cover, an aeration floor and at least one tubing system positioned on top of, or within, the compost pile, wherein the system is capable of providing recirculating aeration. In one aspect, the compost cover is constructed of a substantially gas and liquid impermeable material, and comprises a plurality of aeration ports, or orifices, positioned on the surface of the compost cover. Alternatively, aeration ports may be omitted from the compost cover, whereby the compost cover is substantially gas and liquid impermeable. As described above, the surface of the aeration floor is provided with a plurality of gas flow apertures, or orifices that correspond to at least one, for example a network of, gas flow pipes and/or channels installed below grade. An air suction manifold that sealably and removably connected to at least one outlet of the network of channels and/or pipes, provides suction of exhaust air from the bottom area of the compost biomass. The system additionally comprises an air distributor that is sealably and removably connected to the air suction manifold.

An air inlet is connected to the air suction manifold by way of an air modulating device, such as a valve or fan, thereby providing fresh air to the system. The fresh air is mixed with the exhaust air having low levels of oxygen which exits from an outlet of the aeration floor. The resulting mixture of fresh air and exhaust air passes to the air distributor. A portion of the air mixture is then distributed towards a discharge manifold by way of an air modulating device, such as a valve or fan, which directs the air mixture towards an odor control device, such as a biofilter.

In one embodiment, the remaining portion of the air mixture is recirculated and distributed to the compost pile via the compost cover, which comprises a network of perforated aeration channels on its surface. In another embodiment, the remaining portion of the fresh and exhaust air mixture is recirculated and distributed to the compost pile by way of at least one tubing system. The tubing system, which comprises a plurality of aeration ports, is arranged generally on or below an upper surface of the compost biomass pile. The mixture of fresh and exhaust air is returned to the compost biomass pile through the aeration ports, providing recirculating aeration to the composting system.

In yet another embodiment, the composting system comprises a generally planar working surface, an aeration vault forming system, and an optional compost cover. This composting system is capable of providing passive or convective aeration. The aeration vault forming system is placed on the upper surface of the working surface, and a compost biomass pile is placed over the top. A compost cover may optionally be placed on top of the compost biomass. The aeration vault forming system is generally substantially hollow and may be either rigid or semi-rigid. In certain embodiments, the aeration vault forming system comprises an inflatable form. The aeration vault forming system may be left in place on the working surface, on which the compost pile is allowed to settle. Alternatively, after the compost pile settles on the aeration vault forming system, the vault forming system may be removed. When an aeration vault forming system comprising an inflatable form is employed, the inflatable form may be deflated prior to removal. Upon removal of the vault forming system, an aeration vault having substantially the same dimensions as the removed vault forming system is formed underneath, or within, the compost pile.

The aeration vault may be left open at one or both ends whereby air can flow freely through the aeration vault via the open ends, allowing the compost pile to be passively aerated by way of convective aeration. Alternatively, the one end of the aeration vault may be connected to a forced air aeration system, allowing induced aeration to take place within the composting system, wherein desirable oxygen and temperature levels of the compost pile can be controlled and maintained, and the production of compost odors can be substantially eliminated.

BRIEF DESCRIPTION OF THE DRAWINGS

The present invention will be described in greater detail in the following detailed description, with reference to the accompanying drawings, wherein.

DETAILED DESCRIPTION OF THE INVENTION

Systems and methods for generating compost that employ aeration to aerobically degrade and stabilize organic wastes are provided. The composting systems disclosed herein are capable of effectively controlling compost odors, maintaining desired oxygen levels in the biomass, and minimizing evaporative drying of the biomass.

Figure 1:
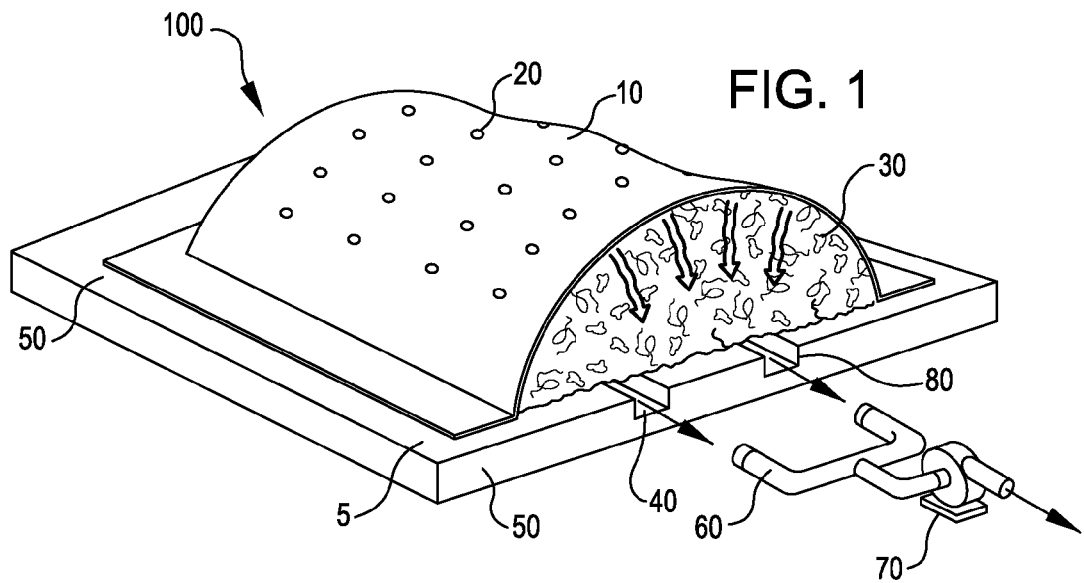
FIG. 1 shows a perspective view of an embodiment of a compost generating system.

In the embodiment shown in FIG. 1, the composting system 100 comprises at least one aerated composting zone 5. Composting system 100 is provided with a compost cover 10 and an aeration floor 50. Compost biomass 30 for use in generating compost is placed on aeration floor 50, and compost cover 10 is placed over and substantially covers biomass 30. The edges of compost cover 10 may be weighted and/or may be provided with straps that connect to fastening points in aeration floor 50. Compost cover 10 is further held in place by way of suction generated from aeration floor 50. A central aeration and control system (not illustrated) controls the air flow, temperature, pressure, and the like, of inventive composting system 100 via automatic or manual means. In embodiments where composting system 100 is provided with a plurality of aerated composting zones, each composting zone may be controlled either independently or collectively by the central aeration and control system.

Compost cover 10 is constructed of a durable fabric that is substantially gas and liquid impermeable, and preferably reusable. Compost cover 10 is provided with a plurality of aeration ports, or orifices, 20 positioned on its surface. Aeration ports 20 are replaceable and may be constructed in any size and configuration to meet the air-flow requirements for various feedstock, zone size, and process goals. Aeration ports 20 may also be constructed to allow variable and manual sizing of their apertures, and each aeration port 20 may be provided with a one-way flow check valve. In certain embodiments, aeration ports 20 have generally circular configurations, with a diameter of from about 0.05 inches to about 1.5 inches. Aeration ports may thus measure, for example, about 0.25, 0.5 or 0.75 inches in diameter. The ports 20 may be completely open, partially open, or completely closed.

The fabric of compost cover 10 prevents the passage of gas or liquid except through aeration ports 20. Compost cover 10 is generally constructed of durable, UV resistant, waterproof, and relatively light-weight materials. As described above, compost cover 10 substantially covers compost pile 30 and is held in place to aeration floor 50, providing a loose seal. Compost cover 10 may be held in place to aeration floor 50 by means of weights provided at its edges. Alternatively, the edges of the compost cover 10 may be provided with strapping means whereby compost cover 10 may be connected to fastening means positioned on aeration floor 50. The weight means and/or strapping means act to secure cover 10 in windy conditions, as well as during recovery and deployment steps. During operation, the negative aeration of composting system 100 causes compost cover 10 to cling to the compost pile 30, thereby loosely sealing compost cover 10 to the aeration floor 50. Compost cover 10 may be placed over or removed from compost pile 30 using, for example, a commercial tarp-roller.

In another embodiment, compost cover 10 may be provided with an integrated compost pile irrigation system to maintain moisture during periods of high aeration. Compost cover 10 may also, or alternatively, be provided with an integrated air re-circulation network to introduce warm air to the upper area of the compost biomass 30.

Unlike various micro-porous compost covers known in the art, the permeability of compost cover 10 does not change over time due to soiling, and the aeration ports 20 of compost cover 10 may be constructed to permit any air flow rate. Also, unlike impermeable plastic compost sleeves, compost cover 10 is re-usable, may be readily removed from the compost pile 30 to allow turning and re-mixing of the compost, and may be integrated with an aeration floor 50 that can collect and manage condensate or leachate.

Aeration floor 50 may be constructed of concrete or the like. In one embodiment, the surface of aeration floor 50 is provided with a plurality of gas flow apertures, or orifices, that correspond to a network of gas flow channels 40 installed below grade of aeration floor 50. Pipes, tubes, conduits, hoses, trenches, ditches, gutters, dugouts, vaults formed in the compost and the like, may be use in addition to, or in place of, channels 40. In one embodiment, the gas flow apertures are provided in generally rigid covers, or plates, that are positioned on top of, and cover, gas flow channels 40. Such plates may be formed, for example, from stainless steel. An air suction manifold 60, which is sealably and removably connected to at least one outlet 80 of the network of gas flow channels 40, provides air suction from the bottom area of compost biomass 30. Air suction manifold 60 draws and distributes odorous exhaust air from compost biomass 30 through the plurality of gas flow apertures of aeration floor 50, to the network of gas flow channels 40, and through outlet 80. The air then passes through air suction manifold 60, to air distributor 70 that is sealably and removably connected to air suction manifold 60 at its inlet. Air distributor 70 may be, for example, an air blower. From air distributor 70, the exhaust air from compost biomass 30 is passed to a discharge manifold connected to the output of air distributor 70. The discharge manifold directs the air towards an odor control device (not shown) such as a biofilter. The exhaust air is then treated by the odor control device to substantially eliminate the compost odor, and the treated air is distributed into its surroundings. Aeration floor 50 is compatible with front end-loaders and is resistant to plugging by compost biomass 30.

In another embodiment, aeration floor 50 has a network of gas flow channels 40, defined by a plurality of perforated pipes, installed on-grade that provide air suction at the bottom of compost biomass 30.

The aeration and control system of inventive system 100 serves to secure compost cover 10, and to deliver and modulate the air flow to maintain the desired conditions in the compost biomass 30. In one embodiment, the aeration and control system is automated to modulate the flow of air based on the feedback of at least one process variable. The ranges of the variables may be preset by an operator. Process variables include, but are not limited to, temperature, oxygen level and pressure. Alternatively, the aeration and control system may be controlled manually by an operator.

The process variable settings may include a minimum suction setting sufficient to keep compost cover 10 held in place to aeration floor 50 and to prevent fugitive emissions, a minimum air-flow rate sufficient to maintain a minimum oxygen level to satisfy metabolic requirements of the aerobic bacteria within the biomass, and a maximum temperature setting to avoid overheating the biomass 30.

Figure 2:
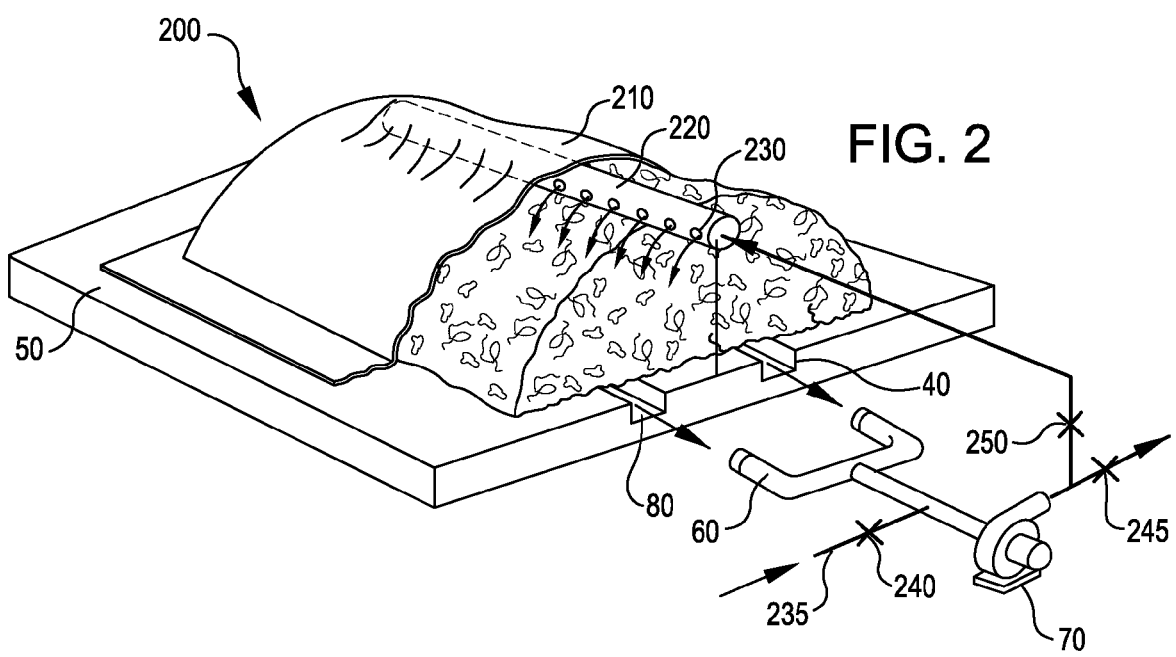
FIG. 2 shows a perspective view of another embodiment of a compost generating system.

FIG. 2 shows another composting system 200. Composting system 200, which is capable of providing recirculating aeration, comprises a compost cover 210, an aeration floor 50, and a tubing system 220. In this embodiment, compost cover 210 is substantially gas and liquid impermeable. As for composting system 100 described above, the surface of aeration floor 50 is provided with a plurality of gas flow apertures that correspond to a network of gas flow pipes and/or channels 40 installed below grade. An air suction manifold 60 is sealably and removably connected to at least one outlet 80 of the network of channels and/or pipes, and provides removal of exhaust gases from the bottom area of the compost biomass 30. An air distributor 70 is sealably and removably connected to the air suction manifold 60.

An air inlet 235 is connected to air suction manifold 60, for example by way of an air valve 240, and provides fresh air to the system. The fresh air is mixed with the hot exhaust air having low levels of oxygen, which exits from outlet 80 of the aeration floor 50. The mixture of fresh air and exhaust air travels towards the air distributor 70. A portion of the air mixture is distributed towards a discharge manifold, for example by way of a valve 245, which directs the air mixture towards an odor control device, such as a biofilter.

In one embodiment, the remaining portion of the air mixture passes through an air flow control device, such as valve 250, and is recirculated to the compost pile 30 via a network of perforated aeration channels (not shown) provided in compost cover 210. In another embodiment, the remaining portion of the fresh and exhaust air mixture passes through valve 250, and is recirculated to the compost pile 30 by way of at least one tubing system 220. Tubing system 220 comprises a plurality of aeration ports, or orifices, 230, and is arranged generally on or below an upper surface of the compost pile 30, whereby the mixture of fresh and exhaust air is returned to compost pile 30, providing recirculating aeration to the composting system 200.

Figure 3:
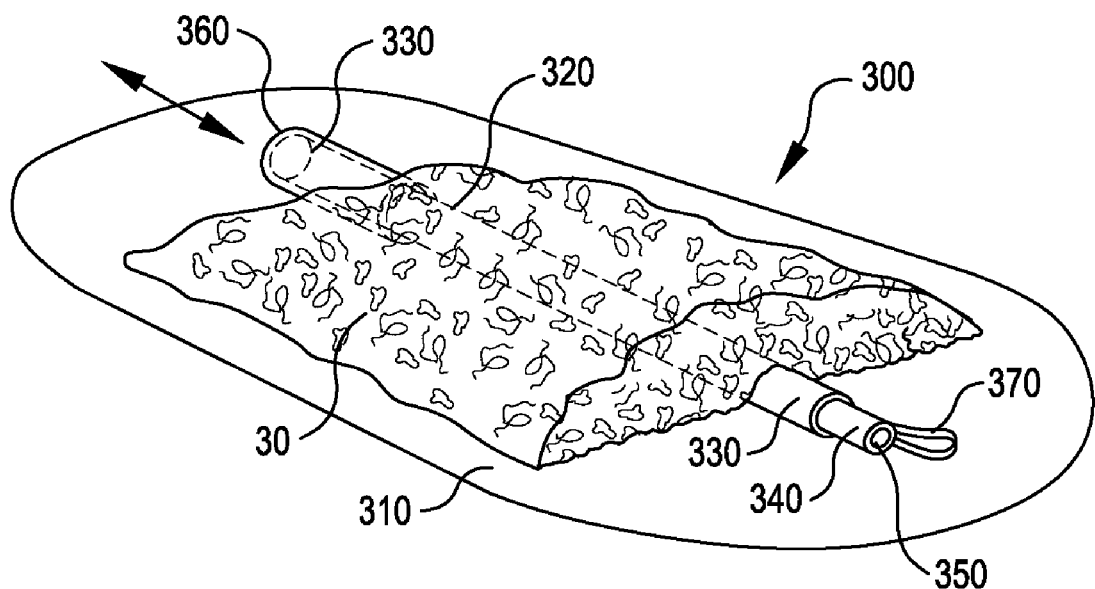
FIG. 3 shows a perspective view of yet another embodiment of a compost generating system.

FIG. 3 illustrates another composting system 300. Composting system 300 comprises a working surface 310, and an aeration vault forming system, 320. Composting system 300 is capable of providing passive or forced convective aeration. The aeration vault forming system 320 is placed on the upper surface of the working surface 310, and a compost pile 30 is placed over vault forming system 320 on working surface 310. A compost cover (not shown) may optionally be placed on top of the compost pile 30.

The aeration vault forming system 320, which has a generally elongated, tubular, configuration, is generally hollow, and may be rigid or semi-rigid. In one embodiment, aeration vault forming system 320 comprises two rigid or semi-rigid guide tubes 330 positioned at its front and rear ends, an inflatable form, such as a tube or pipe, 340 provided with a fill valve 350 and a pressure relief valve (not shown), and a connectable removal means 370. Inflatable form 340 may be constructed of any heat welded fabric known in the art, such as rubberized materials, nylon or polyester fabric, and other materials used in the construction of inflatable watercraft. Inflatable form 340 is generally sized such that, when deflated, its cross-section is smaller than the internal diameter of guide tubes 330, allowing removal of inflatable form 340 by pulling through guide tubes 330. When inflated, inflatable form 340 preferably has an external diameter that is greater than the internal diameter of rigid tubes 330, such that guide tubes 330 are substantially filled by inflatable form 340. While the embodiment illustrated herein employs two guide tubes, the aeration vault forming system may alternatively employ a single guide tube positioned at one end of the system.

In an alternative embodiment, a generally rigid form, such as a pipe, may be employed in place of inflatable form 340. Such rigid forms preferably have an external diameter that is smaller than the internal diameter of guide tubes 330.

Removal means 370 allows for easy removal of aeration vault forming system 320, in particular inflatable form 340, from compost pile 30 and may be in the form of pull straps, chains, loops, and the like.

Aeration vault forming system 320 may be left in place on working surface 310 of composting system 300. In this embodiment, at least a portion of vault forming system 320 is preferably gas permeable or semi-permeable. Alternatively, after compost pile 30 settles on aeration vault forming system 320, vault forming system 320 may be removed from the composting system 300. When an aeration vault forming system 320 including an inflatable form is employed, inflatable form 340 may be deflated prior to removal from composting system 300. Typically, inflatable form 340 is inflated to a pressure of about 2.5 psi.

Figure 4:
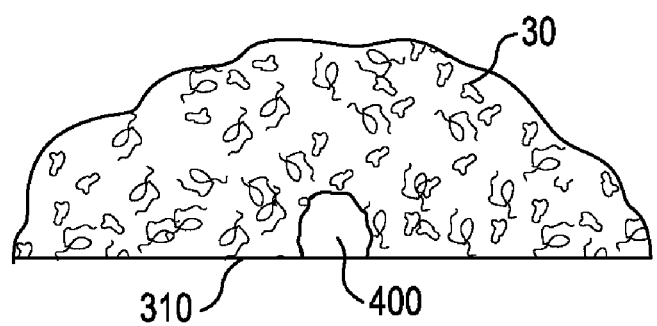
FIG. 4 shows a cross-sectional view of the compost generating system of FIG. 3.

As shown in FIG. 4, after aeration vault forming system 320 is removed, an aeration vault, or channel, 400 having a substantially arch-like, circular or oval configuration, is formed underneath the compost pile 30. Aeration vault 400 has substantially the same dimensions as aeration vault forming system 320. Compost pile 30 is typically between about four and fourteen feet in height, and may be, for example, between about four and six feet high, between about seven and nine feet high, or between about twelve and fourteen feet high. The height of compost pile 30 is generally considerably higher than the height of aeration vault 400 in order to preserve the structure of the arch configuration of vault 400. Aeration vault 400 is typically between about six and eighteen inches in height, about six and eighteen inches wide at its base, and between fifteen to seventy five feet long. For example, aeration vault may be about 6 inches, 12 inches, 15 inches or 18 inches high. Composting system 300 may be provided with multiple, for example, two to four, formed aeration vaults 400.

Aeration vault 400 may be left open, whereby air can flow freely through vault 400 via the open ends, allowing the compost pile 30 to be passively aerated by way of natural convective aeration. Alternatively, one end 360 of vault 400 may be connected to a forced air aeration system (not shown), allowing induced aeration to take place by either positive or negative circulation within composting system 300, wherein desirable oxygen and temperature levels of the compost pile 30 can be controlled and maintained, and the production of compost odors can be substantially eliminated. In one embodiment, a generally vertical wall is provided at one end of the aeration vault forming system. This wall is provided with a passageway extending through the wall such that, when the aeration vault forming system is removed, air is able to enter the aeration vault through the passageway. The wall additionally aids in keeping compost pile 30 in place on working surface 310.

Vault forming system 320 may be connected to an air pump for inflating and deflating inflatable form 340. A vault spool may be employed for rolling the deflated inflatable form 340. An aeration and control system, as described above, may be connected to composting system 300.

In operation, inflatable form 340 is first unrolled off its spool and extended along the length of working surface 310. The inflatable form 340 is then connected to a first guide tube 330 at a first end of aeration vault forming system 320 and a second guide tube 330 at the second end of aeration vault forming system 320. Inflatable form 340 is fully inflated and forms a plug in both guide tubes 330. A compost pile 30 is built over inflatable form 340, for example using a bucket-loader or conveyor. The compost pile 30 is typically shaped so that guide tubes 330 have a first end exposed and a second end arranged under the full depth of compost pile 30. Compost pile 30 is then allowed to settle over approximately 2-24 hours.

Once compost pile 30 has settled, the valve at the front of inflatable form 340 is opened and inflatable form 340 is deflated. Typically, some compost falls onto the form 340 and causes uniform deflating along the entire length of inflatable form 340. If additional deflating of form 340 is required, a vacuum device can be used. After another optional brief settling time, inflatable form 340 is pulled out from compost pile 30 through guide tube 330. Compost material that has fallen from the roof of the aeration vault 400 on to the inflatable form pipe 340 is brought out on top of the tube 340. Inflatable pipe 340 can be spooled directly as it is removed from guide tube 330. Guide tube 330 is then capped so that the air being pulled through the aeration vault 400 does not bypass the compost pile 30.

Composting system 300 has the advantage of low cost and is easy to use because inflatable form 340 is relatively lightweight and easy to handle. Also, since inflatable form 340 is removable, it is not in the way of the front-end loaders when the compost pile is broken down. In addition, inflatable form 340 is not susceptible to damage from the loader and is reusable. Fewer forms 340 are required because, once the aeration vault under the compost pile is formed, the form 340 can be removed.

While certain embodiments of the present invention have been described in detail, it will be understood that various changes could be made in the above constructions without departing from the scope of the invention. It is thus intended that all matter contained in the above description or shown in the accompanying drawings shall be interpreted as being illustrative and not limiting.

I claim:

1. A system for generating compost, comprising:
   a negative aeration floor comprising a plurality of gas flow apertures positioned on the surface of the aeration floor; and
   a compost cover sized to cover a compost biomass pile placed on the aeration floor, the compost cover being constructed of a substantially gas and liquid impermeable material and having a plurality of uniformly distributed aeration ports that permit passage of gas through the compost cover,
   wherein the plurality of gas flow apertures are connected to at least one gas flow channel installed below grade of the aeration floor.

2. The system of claim 1, wherein edges of the compost cover are weighted.

3. The system of claim 1, wherein the compost cover is provided with strapping means that are connectable to fastening points provided on the aeration floor.

4. The system of claim 1, further comprising an air suction manifold sealably and removably connected to at least one outlet of the gas flow channel, wherein the air suction manifold draws exhaust air downwards from a bottom area of the compost biomass, through the plurality of gas flow apertures, to the gas flow channel.

5. The system of claim 4, further comprising an air distributor connected to the air suction manifold, wherein the exhaust air passes though the air suction manifold to the air distributor, and is distributed towards an odor control device.

6. The system of claim 5, wherein the odor control device is a biofilter.

7. The system of claim 1, further comprising a control system for modulating temperature, oxygen level, and pressure within the compost generating system.

8. A system for generating compost, comprising:
   a negative aeration floor comprising a plurality of gas flow apertures positioned on the surface of the aeration floor;
   a compost cover sized to cover a compost biomass pile positioned on the aeration floor; and
   a tubing system comprising a plurality of aeration ports for supplying air to an area on an upper surface of the compost pile,
   wherein the plurality of gas flow apertures are connected to at least one gas flow channel installed below grade of the aeration floor.

9. The system of claim 8, wherein the system is capable of providing recirculating aeration to the compost biomass pile.

10. The system of claim 8, further comprising an air suction manifold sealably and removably connected to an outlet of the at least one gas flow channel, wherein the air suction manifold draws exhaust air downwards from a bottom area of the compost biomass, through the plurality of gas flow apertures in the aeration floor, to the at least one gas flow channel.

11. The system of claim 10, further comprising an air distributor connected to the air suction manifold, wherein the exhaust air passes through the air suction manifold to the air distributor, and is distributed towards an odor control device.

12. The system of claim 10, further comprising at least one fresh air inlet connected to the air suction manifold to provide fresh air to the system, wherein the fresh air is mixed with the exhaust air to provide a mixture of fresh air and exhaust air, and at least a portion of the mixture of fresh and exhaust air is returned to the compost pile through the plurality of the aeration ports, thereby providing recirculating aeration to the system.

13. The system of claim 1, wherein the aeration ports have a diameter of from about 0.05 inches to about 1.5 inches.

\* \* \* \* \*